UNITED STATES PATENT OFFICE.

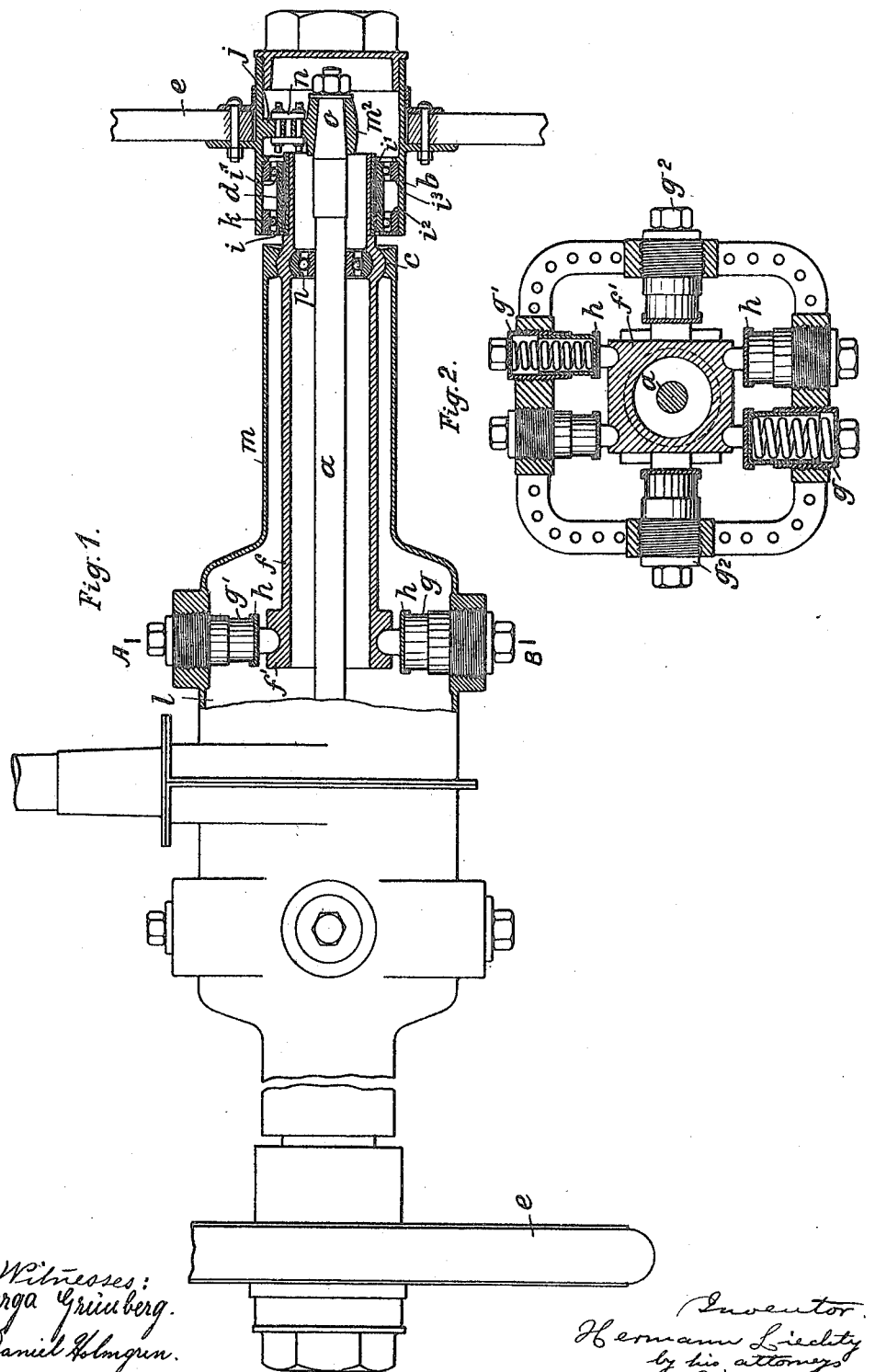

HERMANN LIECHTY, OF BERNE, SWITZERLAND.

AXLE FOR MOTOR-CARS.

1,136,349.   Specification of Letters Patent.   Patented Apr. 20, 1915.

Application filed October 4, 1913. Serial No. 793,280.

*To all whom it may concern:*

Be it known that I, HERMANN LIECHTY, a citizen of the Republic of Switzerland, residing at 15 Dapplesweg, Berne, in the Republic of Switzerland, have invented new and useful Improvements in Axles for Motor-Cars, of which the following is a specification.

My invention relates to improvements in axles for motor driven vehicles and the like, and consists in a novel arrangement of wheel axle and driving axle, and in new constructions, and combinations which will be hereafter fully described and then specifically pointed out in the claims appended.

One of the main objects of my present invention is the production of a wheel axle system that admits of a direct transmission of the driving force to the wheel while the wheel axle is non-rotating and is rendered elastic by means of springs in such a way as to insure a soft motion of the car in order that pneumatic tires and bearing springs may be dispensed with. For that purpose the tubular wheel axle extends beyond its bearing and is supported at its end by springs mounted in the casing of a universal joint. The wheel axle is provided with a ball bearing for the running wheel. The connection between wheel and driving axle is effected by means of a system of flexible links, or by means of a jointed coupling, admitting of a direct transmission of the driving force from driving axle to driven wheel without preventing the wheel from assuming changeable positions, concentric, or eccentric, relative to the driving axle. This new axle arrangement may also be applied to wheels which otherwise run loosely but now can also be driven from the motor.

In the accompanying drawings that form a part of this specification, and in which like characters of reference indicate the same or like parts, an embodiment of my invention is given by way of example.

In these drawings, Figure 1 is a partly sectional longitudinal view of an axle arrangement made in accordance with the invention, while Fig. 2 is a cross-sectional view taken on the line A—B in Fig. 1.

The tubular wheel axle $f$ in Fig. 1 is supported at $c$ in a spherical bearing carried by the casing $m$ at its outer end. Thus the wheel axle forms a double-armed lever the arms of which are of unequal lengths. The arm $d$ is provided with ball races $i$, $i^1$ with annular grooves for the balls $k$ to run in. The longer arm $f$ terminates in a head $f^1$ held in central position by two strong helical springs $g$, $g$, from below, by two smaller ones $g^1$, $g^1$ from above, and by a strong one $g^2$ projecting from each side. These springs are inclosed in caps screwed into the outer square casing $l$. Smaller caps are slidably fitted into these caps and inclose the springs toward the head $f^1$ which bears upon the springs by means of plates $h$ provided with central projections that engage into countersunk holes in the head $f^1$.

The hub $b$ of the driven wheel $e$ is provided with ball races $i^2$ and $i^3$ in the annular grooves of which the balls $k$ are made to run. There is a false wheel hub $m^2$ mounted on the wheel seat $o$ of the axle $a$, and connected to the annular projection $j$ within the hub proper $b$ by means of a flexible clutch-like device $n$ permitting the wheel to assume an eccentric position relative to the driving axle $a$. In line with the spherical bearing $c$ a ball bearing $p$ is provided upon the driving axle $a$. Any shocks imparted to the wheel are absorbed by the springs $g$, $g$ and $g^2$, $g^2$. The smaller springs $g^1$, $g^1$ are to damp the vibrations of the strong springs $g$, $g$ that absorb the shocks produced in upward direction.

I claim—

1. In a vehicle, an axle comprising, in combination with an axle casing, a tubular wheel axle supported, in a spherical bearing, at the end of the axle casing, and having arms one of which carries the wheel and the other one extends into the axle casing and terminates in a head bearing against helical springs arranged to absorb any shocks imparted to the wheel, a drive-axle passing through the tubular wheel axle and connected to the wheel by a flexible coupling device that permits the wheel to assume changeable positions relative to the drive-axle, substantially as set forth.

2. In a vehicle, an axle comprising, in combination with an axle casing, a tubular wheel axle supported, in a spherical bearing, at the end of the axle casing, and having two arms one of which carries the wheel and the other one extends into the axle casing and terminates in a head bearing against helical springs arranged to hold the head in a central position and to absorb upward and sidewise directed shocks, said springs being mounted in caps screwed into the widened axle casing and said springs containing caps having, toward the head of the wheel axle, smaller caps slidably fitted into them, which smaller caps are connected to plates provided with projections engaging into countersunk holes in the head of the wheel axle, substantially as set forth.

3. In a vehicle, an axle comprising, in combination with an axle casing, a tubular wheel axle supported, in a spherical bearing, at the end of the axle casing, and having two arms one of which extends into the axle casing and terminates in a head bearing against helical springs arranged to hold the head in a central position and the other arm carries, in ball bearings, the hub of the wheel to be driven, said hub being connected, by means of a flexible coupling device, to a false hub arranged inside the hub proper, said false hub being mounted, in such a manner as to insure a transmission of the rotation of the drive-axle, on a wheel seat into which the drive-axle terminates, while between the wheel axle and the drive-axle, that passes through the wheel axle, a ball bearing is inserted in line with the spherical bearing of the wheel axle, substantially as set forth.

HERMANN LIECHTY.

Witnesses:
W. HENARHOF,
J. KOHLER.

Copies of this patent may be obtained for five cents each, by addressing the "Commissioner of Patents, Washington, D. C."